Aug. 22, 1944.  S. S. LACHMAN  2,356,675
EXPANDED METAL STRUCTURAL MEMBER
Filed Nov. 19, 1942  2 Sheets-Sheet 1

INVENTOR.
SARAH S. LACHMAN
BY
*Darby & Darby*
ATTORNEYS

Aug. 22, 1944.  S. S. LACHMAN  2,356,675
EXPANDED METAL STRUCTURAL MEMBER
Filed Nov. 19, 1942   2 Sheets-Sheet 2
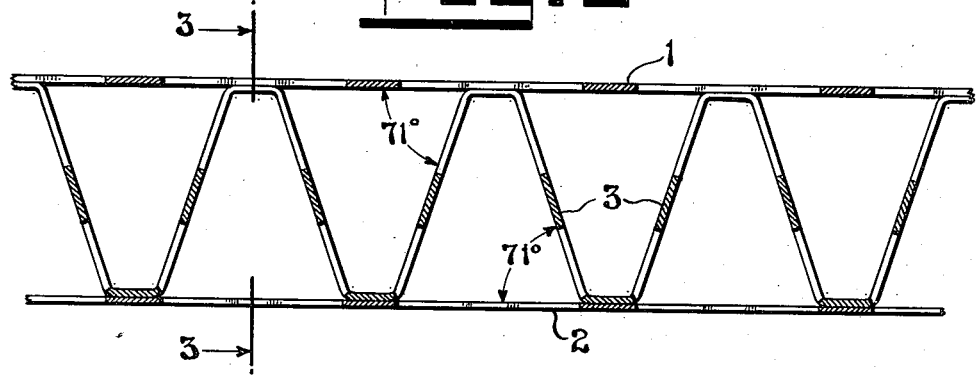
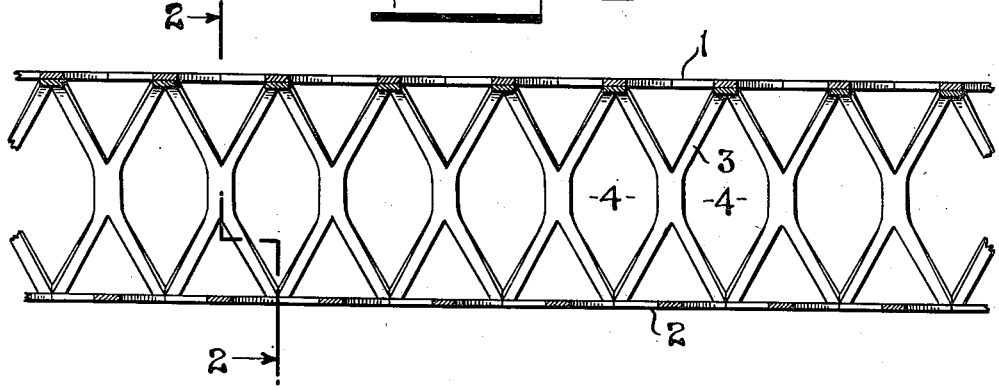
INVENTOR.
SARAH S. LACHMAN
BY
*Darby & Darby*
ATTORNEYS Patented Aug. 22, 1944

2,356,675

UNITED STATES PATENT OFFICE 2,356,675

EXPANDED METAL STRUCTURAL MEMBER

Sarah S. Lachman, New York, N. Y., assignor to Transport Steel Products, Inc., Jersey City, N. J., a corporation of New Jersey Application November 19, 1942, Serial No. 466,155

6 Claims. (Cl. 189—82)

This invention relates to improvements in expanded metal structural members of the type suitable for use as a fabricated beam or grill, sidewalk grating, bridge decking, catwalk, building floors, and the like.

The general object of this invention is to provide a structurally simple construction member which is light in weight while at the same time amazingly strong.

A further object of this invention is the provision of a structural member which is adapted to simple and rapid, and therefore inexpensive, manufacture from readily obtainable construction materials.

Other and more detailed objects of this invention will be apparent from the following description of one embodiment thereof when taken in connection with the attached drawings.

In the accompanying drawings:

Figure 2 is a longitudinal vertical sectional view through a part of the structural member illustrated in Fig. 1, being taken along the staggered line 2—2 as shown in Fig. 3, Figure 3 is a transverse vertical sectional view along the lines 3—3 of Fig. 2.

Figure 1:
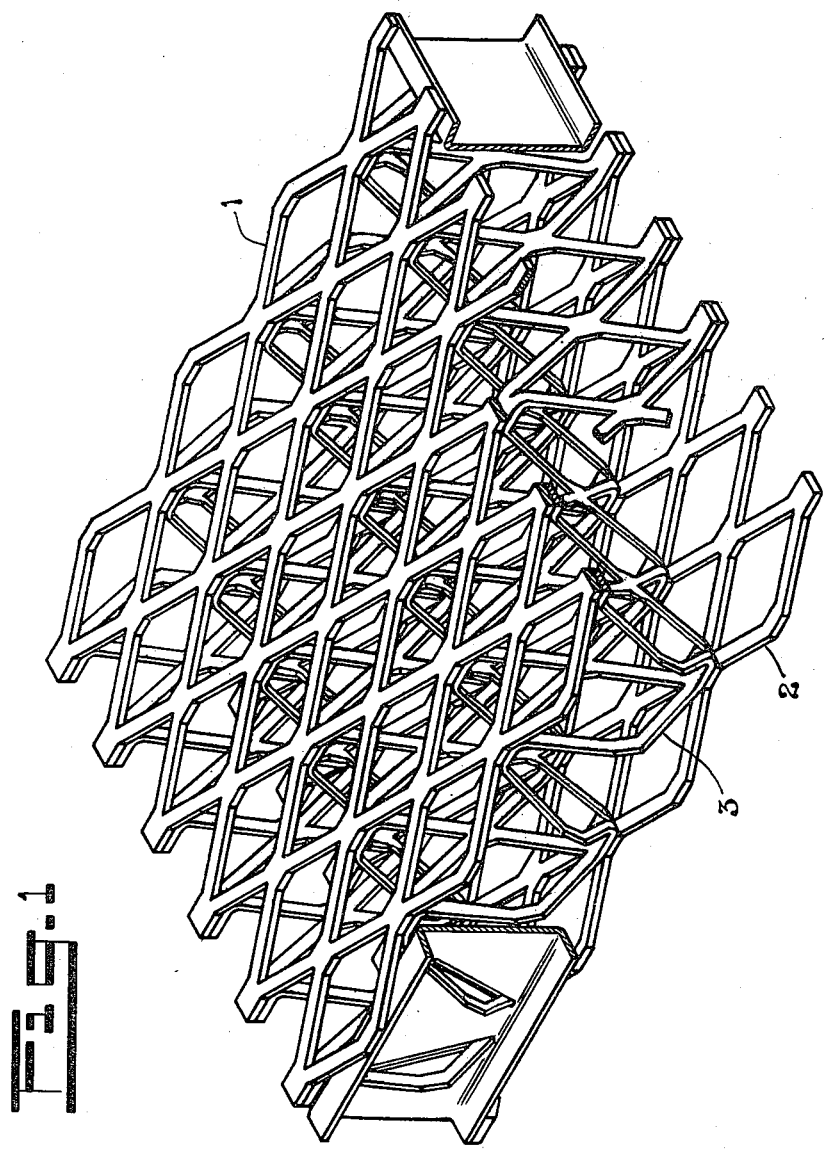
Figure 1 is a perspective view of a structural member in accordance with this invention.

The embodiment of the invention as disclosed in the attached drawings comprises basically three elements, namely, an upper grill or grid 1, made of expanded metal, a lower grill or grid 2, also made of expanded metal, and an intermediate grill or grid 3 of reversely bent expanded metal, as illustrated particularly in Figure 2 (referred to hereafter as "corrugated"), to which the upper and lower grids are rigidly bonded as by welding.

The three grids are all of the same mesh and the intermediate grid is welded at every point of contact with both the upper and lower grids. All three grids are flattened after being expanded, as by rolling, to facilitate welding. The intermediate grid is bent at points spaced apart the length of one full diamond, as indicated by the diamond 4 in Fig. 3. (The word "diamond" is used to refer to the openings in the expanded metal, whatever their exact shape may be.) The upper and lower grids are offset lengthwise with respect to each other for a distance equal to one-half diamond. (This offset might also be considered as an offset sidewise a distance equal to one-half the width of one diamond.) As the weld points for all three grids are each one diamond apart, the height of my structure is approximately 85 per cent. of the length of one diamond. Having all three grids of the same mesh, and having a distance of one-half the length of the diamond between the vertical plane of a weld at the top and the vertical plane of a weld at the bottom, with allowance for the flats at the top and bottom of the corrugated member, makes the angle of the bend of the intermediate grid approximately 71°, as indicated in Figure 2. This angle gives the maximum strength per unit weight to the structure, and the strength falls off quite rapidly as this angle is departed from, so that for an angle of, say, 50°, the strength per unit weight is only 20-25% of that which occurs with an angle of 71°. It will be understood, of course, that the length of the flats will determine the exact angle, other conditions being as described, and in claiming an angle of 71° I mean to include variations therefrom due to variations in the length of the flats.

What I have referred to above as a flat is called in the claims a bond point and may be defined as the terminal point of a diamond.

The strength of my structure is also greatly increased by having the bends in the corrugated grid a distance apart equal to the length of one diamond. If the structure were arranged so that the bends were one-half diamond apart, the strength again is greatly reduced, the strength of such structure being only approximately 20% of the strength of my structure.

Making the mesh of all three members the same provides a perfectly symmetrical structure in which all the diamonds have the same width as well as the same length, so that the structure is braced equally in all directions and has great strength and rigidity.

As the upper grid is offset lengthwise with respect to the lower grid a distance equal to one-half the length of a diamond, the weld points for the lower grid all fall directly in the center of the space of a diamond of the upper grid, and the weld points for the upper grid all fall directly within the center of the space of a diamond of the lower grid. Welding is therefore facilitated, and may be readily accomplished for the outside grid last to be welded in position by welding fingers which project through the corresponding diamonds of the grid forming the opposite surface.

Since the grids are all made of expanded metal, which is manufactured in large quantities, it is readily obtainable and economical. As expanded metal involves no scrap, it is economical to use.

It will be apparent to those skilled in the art that the details of construction may be varied without departure from the novel relationship of parts herein disclosed. I do not therefore desire to be strictly limited to the disclosure as given for purpose of illustration, but rather to the scope of the claims granted me.

What I claim as new and useful and desire to secure by Letters Patent is:

1. A structural member comprising an outer grid of expanded metal, a second outer grid of expanded metal, an intermediate grid of expanded metal, said grids all having the same mesh, the intermediate grid being bent at points spaced apart by one diamond when measured along each outer grid and also when measured along the intermediate grid to a substantially 71 degree angle with the outer grids, the adjacent portions of the intermediate grid extending between the outer grids being in converging or diverging relationship in side elevation, and the intermediate grid being welded to the outer grids at points of contact which are bond points.

2. A structural member comprising an outer grid of expanded metal, a second outer grid of expanded metal, an intermediate corrugated grid of expanded metal, the adjacent portions of the intermediate grid extending between the outer grids being in converging or diverging relationship in side elevation, said intermediate grid being welded to the outer grids at points of contact, said points of contact being bond points, and said intermediate grid being bent at points spaced apart the length of one diamond to an angle of substantially 71 degrees with respect to said outer grids, said welds when measured along each outer grid and also when measured along the intermediate grid being spaced apart the length of one diamond of the grid along which the measurement is being made.

3. A structural member comprising an outer grid of expanded metal, a second outer grid of expanded metal, an intermediate corrugated grid of expanded metal, all three grids having the same mesh, the adjacent portions of the intermediate grid extending between the outer grids being in converging or diverging relationship in side elevation, said intermediate grid being welded to the outer grids at points of contact which are bond points and forming an angle of substantially 71 degrees with said outer grids, and said welds being spaced apart the length of one diamond when measured along each outer grid and also when measured along the intermediate grid.

4. A structural member comprising an outer grid of expanded metal, a second outer grid of expanded metal, an intermediate corrugated grid of expanded metal, said grids all having the same mesh, the adjacent portions of the intermediate grid extending between the outer grids being in converging or diverging relationship in side elevation, said intermediate grid being welded to said outer grids at points of contact which are bond points, said weld points being spaced apart the length of one diamond when measured along each outer grid and also when measured along the intermediate grid.

5. A structural member comprising an outer grid of expanded metal, a second outer grid of expanded metal, an intermediate corrugated grid of expanded metal, said grids all having the same mesh, the adjacent portions of the intermediate grid extending between the outer grids being in converging or diverging relationship in side elevation, said intermediate grid being welded to the outer grids at points of contact which are bond points, said weld points being spaced apart the length of one diamond when measured along each outer grid and also when measured along the intermediate grid, said weld points on each outer grid being opposite the opening in a diamond of the other outer grid.

6. A structural member comprising an outer grid of flattened expanded metal, a second outer grid of flattened expanded metal, an intermediate corrugated grid of flattened expanded metal, said grids all having the same mesh, the adjacent portions of the intermediate grid extending between the outer grids being in converging or diverging relationship in side elevation, and said intermediate grid being welded to the outer grids at bond points a distance apart the length of one diamond when measured along each outer grid and also when measured along the intermediate grid.

SARAH S. LACHMAN.